(12) United States Patent
Jung et al.

(10) Patent No.: US 12,095,678 B2
(45) Date of Patent: Sep. 17, 2024

(54) GPU-NATIVE PACKET I/O METHOD AND APPARATUS FOR GPU APPLICATION ON COMMODITY ETHERNET

(71) Applicant: RESEARCH & BUSINESS FOUNDATION SUNGKYUNKWAN UNIVERSITY, Suwon-si (KR)

(72) Inventors: Chan Gue Jung, Suwon-si (KR); Young Hoon Kim, Suwon-si (KR); Su Hwan Kim, Suwon-si (KR); Hong Uk Woo, Suwon-si (KR); Ik Jun Yeom, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 476 days.

(21) Appl. No.: 17/497,131

(22) Filed: Oct. 8, 2021

(65) Prior Publication Data
US 2022/0272052 A1      Aug. 25, 2022

(30) Foreign Application Priority Data
Feb. 24, 2021   (KR) .................. 10-2021-0025097

(51) Int. Cl.
*H04L 49/102*   (2022.01)
*G06T 1/20*   (2006.01)
(Continued)

(52) U.S. Cl.
CPC ........ *H04L 49/3063* (2013.01); *H04L 49/102* (2013.01); *H04L 49/351* (2013.01); *H04L 67/104* (2013.01); *G06T 1/20* (2013.01)

(58) Field of Classification Search
CPC . H04L 49/3063; H04L 49/351; H04L 49/102; H04L 67/104; G06T 1/20
See application file for complete search history.

(56) References Cited

U.S. PATENT DOCUMENTS

2012/0110223 A1   5/2012   Khawer et al.
2018/0288433 A1*  10/2018  Oh .................. H04N 7/0127
(Continued)

FOREIGN PATENT DOCUMENTS

| KR | 10-2012-0019711 | | 3/2012 | |
|---|---|---|---|---|
| KR | 20120019711 | * | 5/2012 | ............... G06F 9/46 |

(Continued)

OTHER PUBLICATIONS

Korean Office Action issued on Mar. 2, 2022, in the counterpart Korean Application No. 10-2021-0025097 (6 pages in Korean).

*Primary Examiner* — Kent Krueger
(74) *Attorney, Agent, or Firm* — NSIP Law

(57) ABSTRACT

The disclosure relates to a method and device for inputting and outputting packets inside a GPU based on a commodity Ethernet device. According to embodiments of the disclosure, a method for commodity Ethernet device-based graphic processing unit (GPU) internal packet input/output performed by a GPU internal packet input/output device comprises being allocated an available packet buffer from a memory pool inside a GPU, after packets received from a network interface controller (NIC) are directly transferred to the allocated packet buffer, processing the directly transferred packets through a reception (Rx) kernel, transmitting a transmission packet to a network through the NIC according to an operation of a transmission (Tx) kernel, and returning the allocated packet buffer.

18 Claims, 15 Drawing Sheets

(51) Int. Cl.
    *H04L 49/00*     (2022.01)
    *H04L 49/351*    (2022.01)
    *H04L 67/104*    (2022.01)

(56) References Cited

U.S. PATENT DOCUMENTS

| | | | |
|---|---|---|---|
| 2018/0293757 A1* | 10/2018 | Kambhatla | H04N 19/146 |
| 2021/0117246 A1* | 4/2021 | Lal | G06F 21/53 |
| 2021/0184795 A1* | 6/2021 | Ibars Casas | H03M 13/6561 |
| 2021/0334264 A1* | 10/2021 | Kaigai | G06F 13/4022 |

FOREIGN PATENT DOCUMENTS

| | | |
|---|---|---|
| KR | 10-2013-0087026 | 8/2013 |
| WO | WO 2020/121359 A1 | 6/2020 |

* cited by examiner

[FIG. 1]
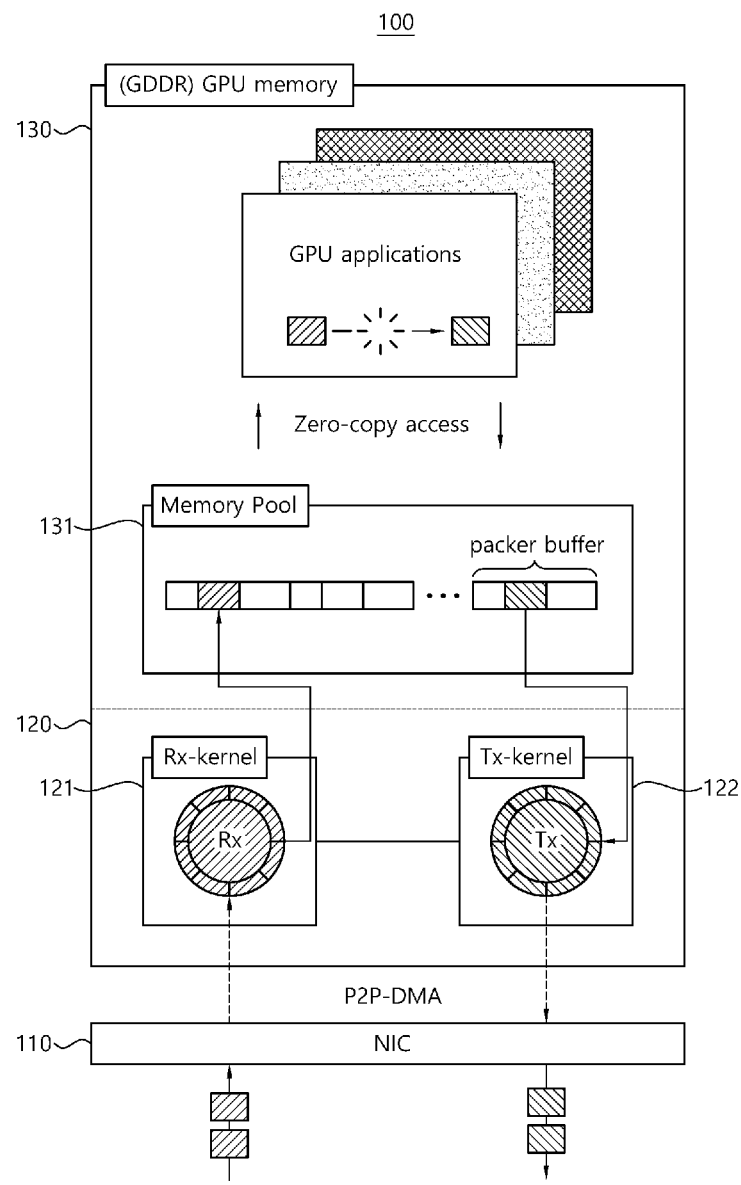

[FIG. 2]
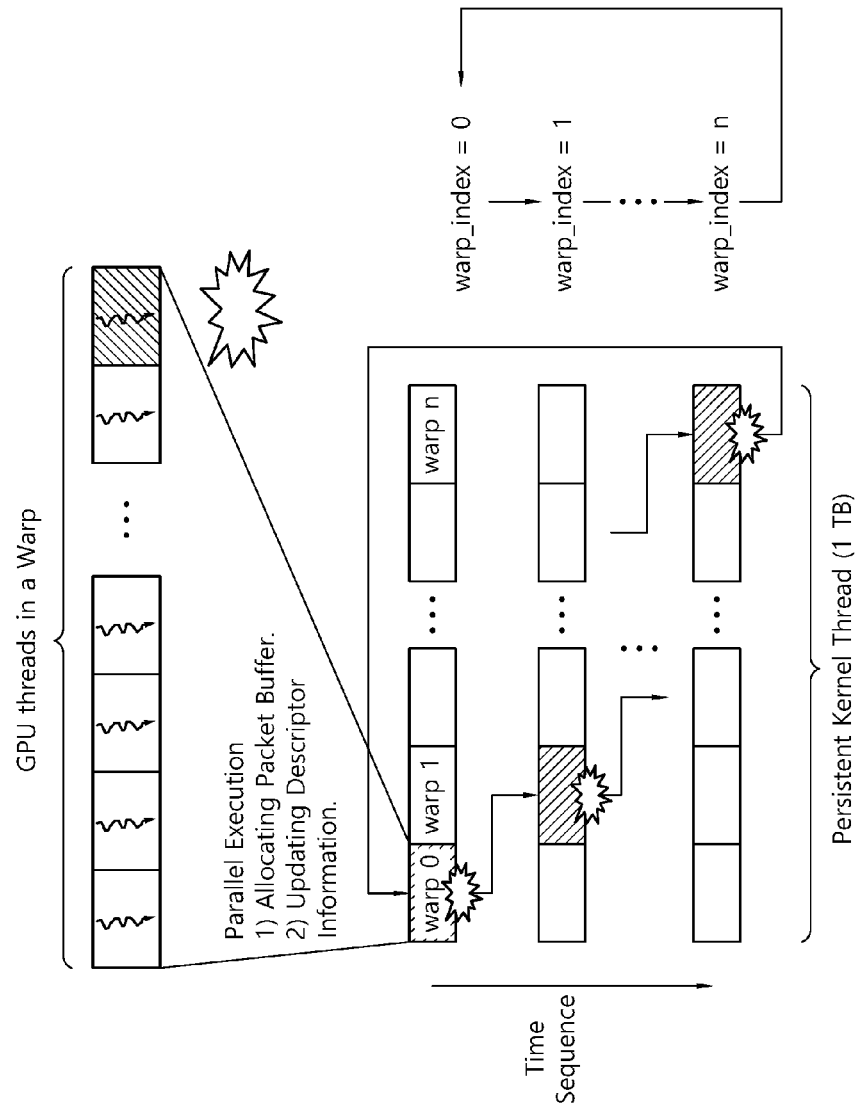

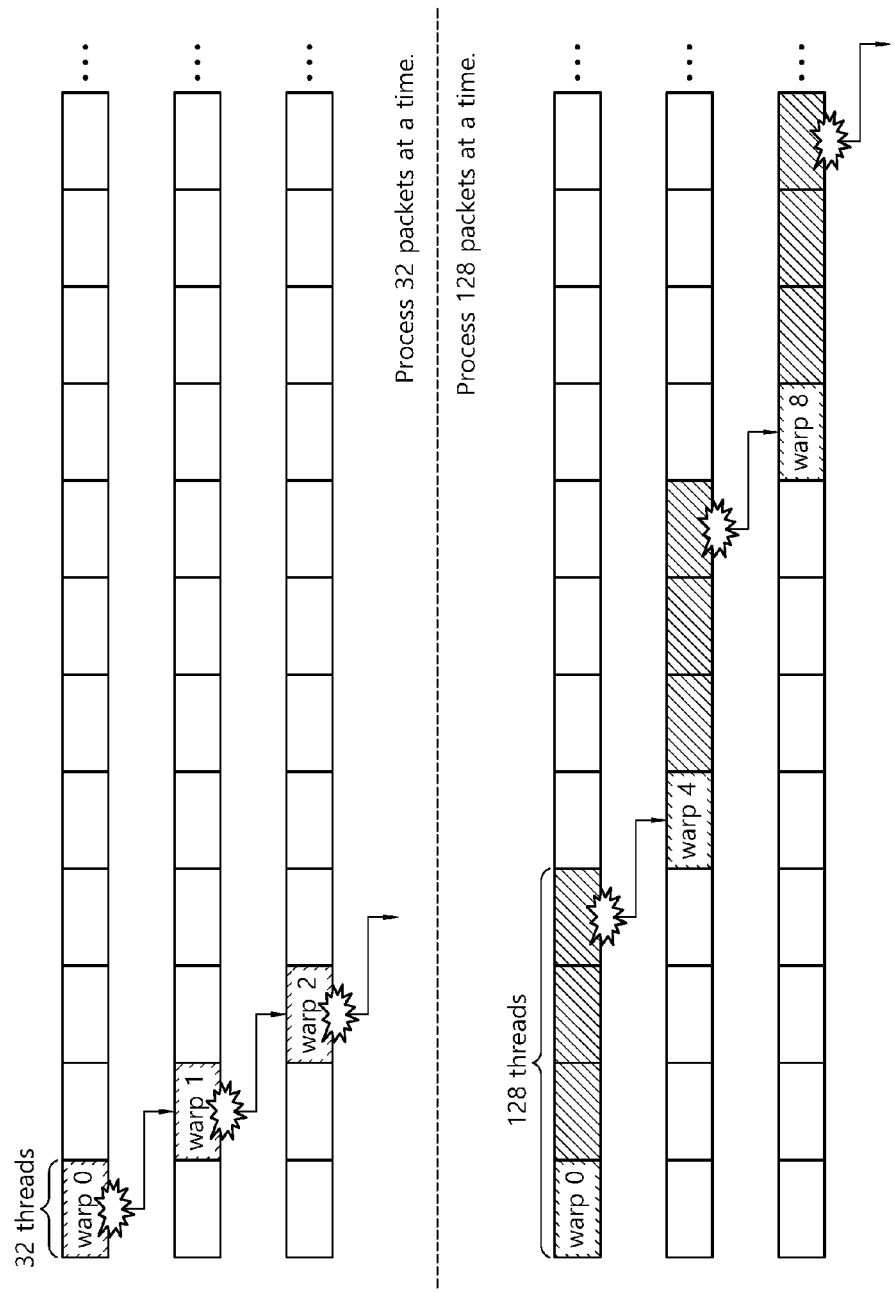

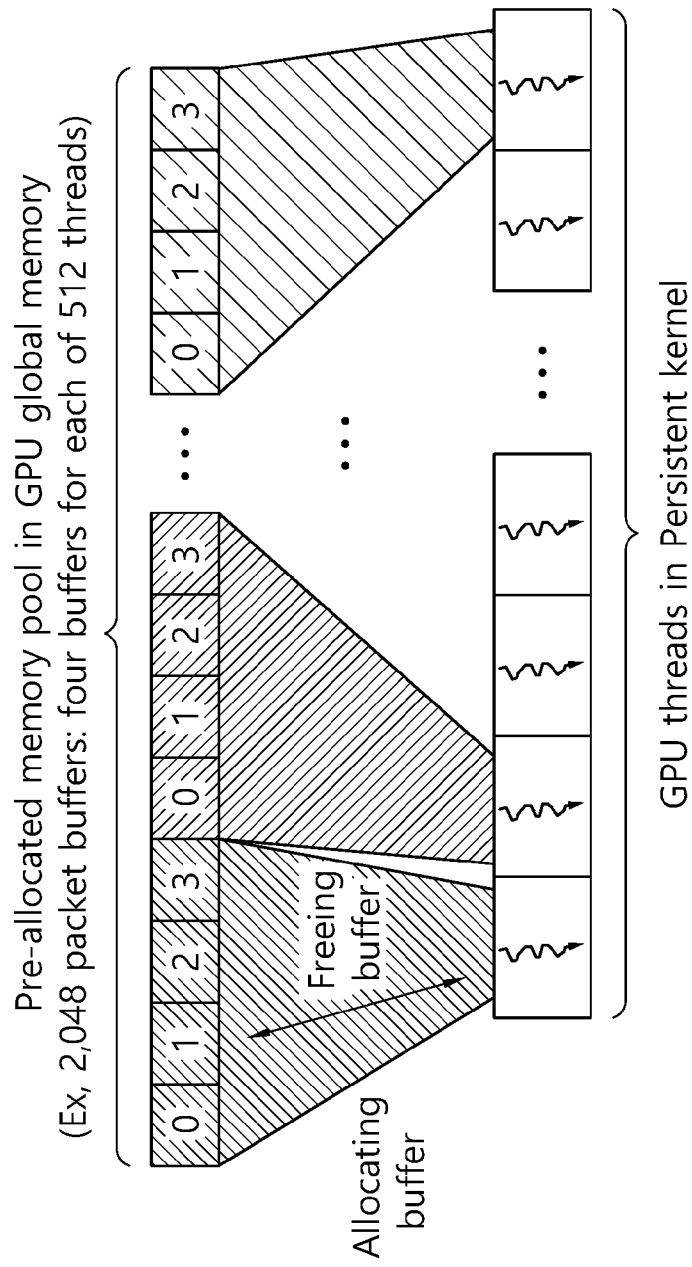
[FIG. 4]

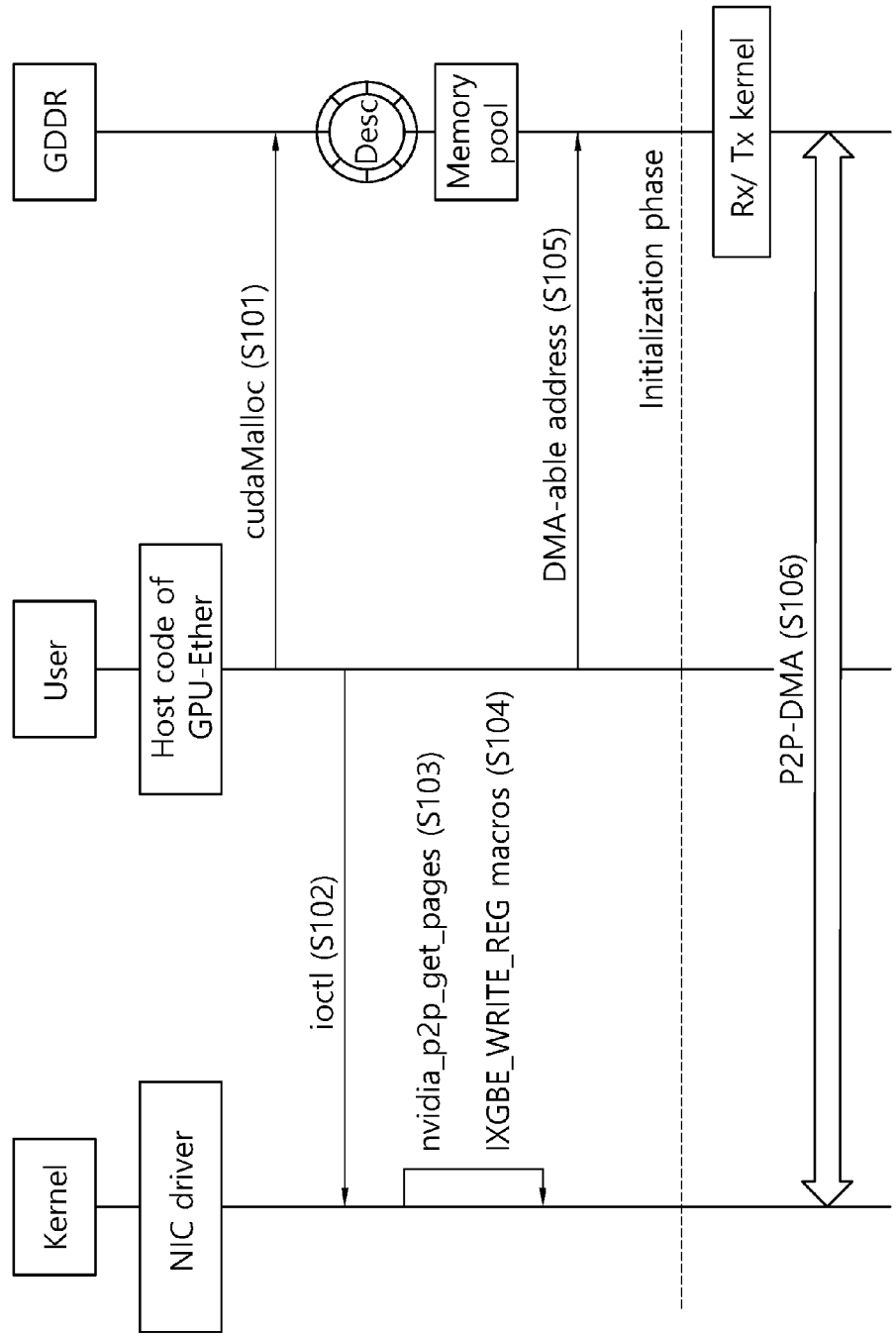

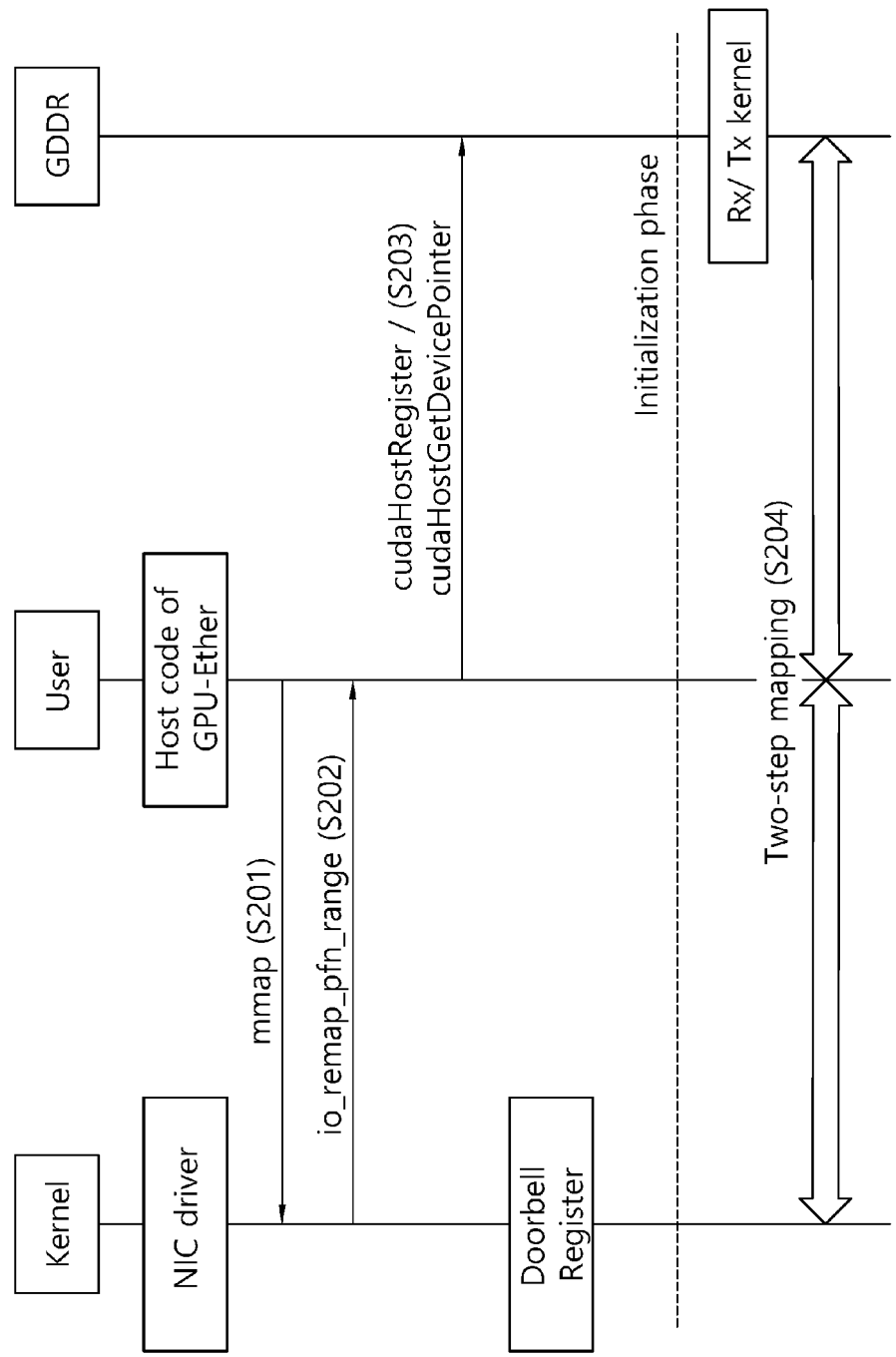
[FIG. 6]

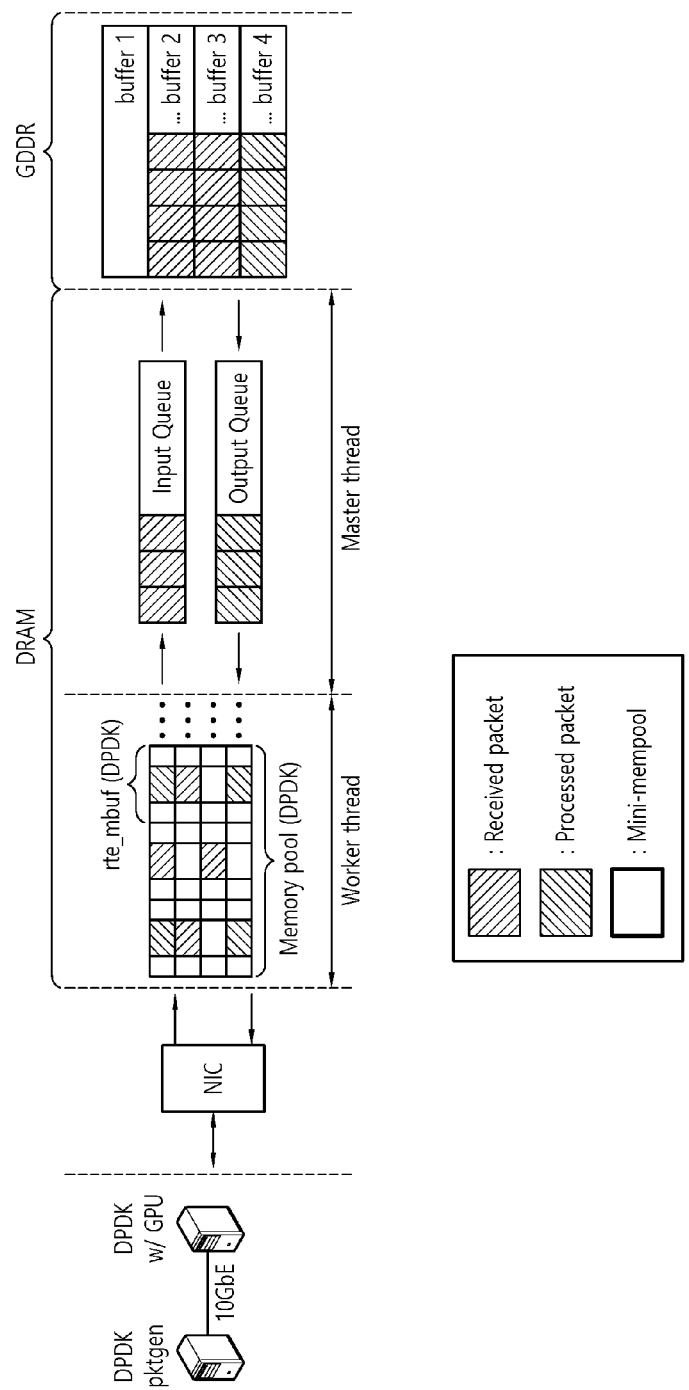
[FIG. 7]

[FIG. 8]
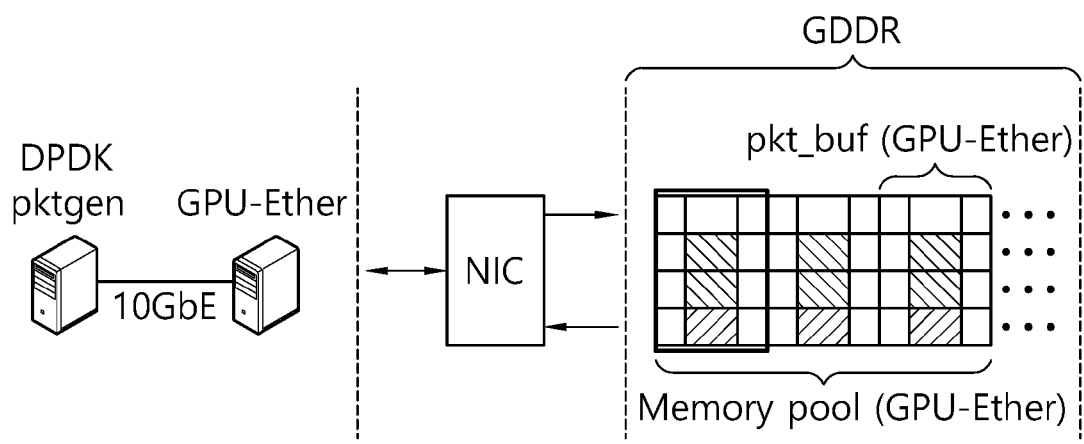
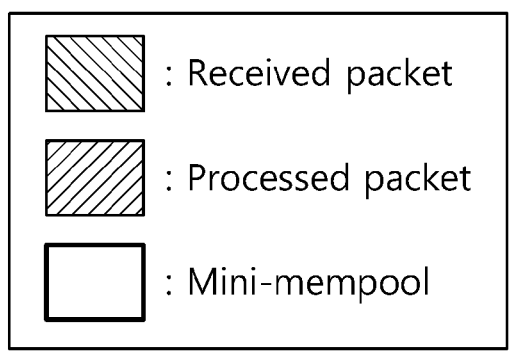

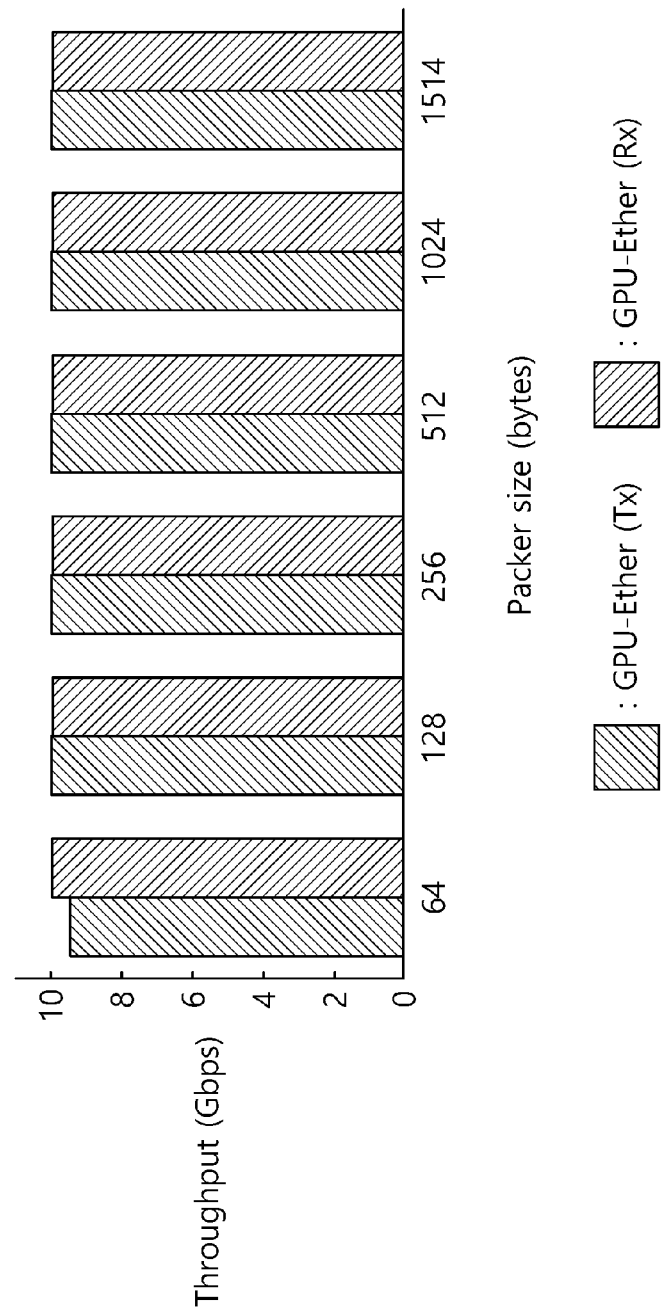
[FIG. 9]

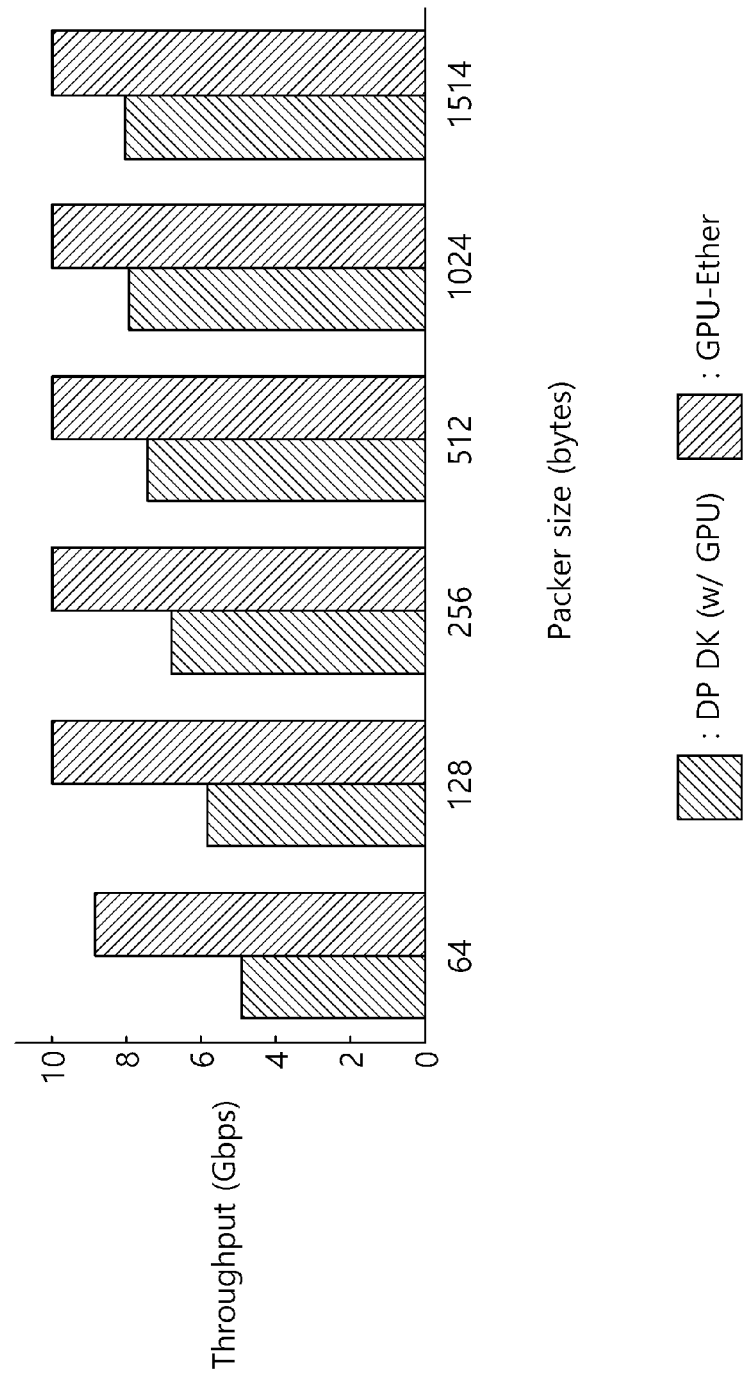
[FIG. 10]

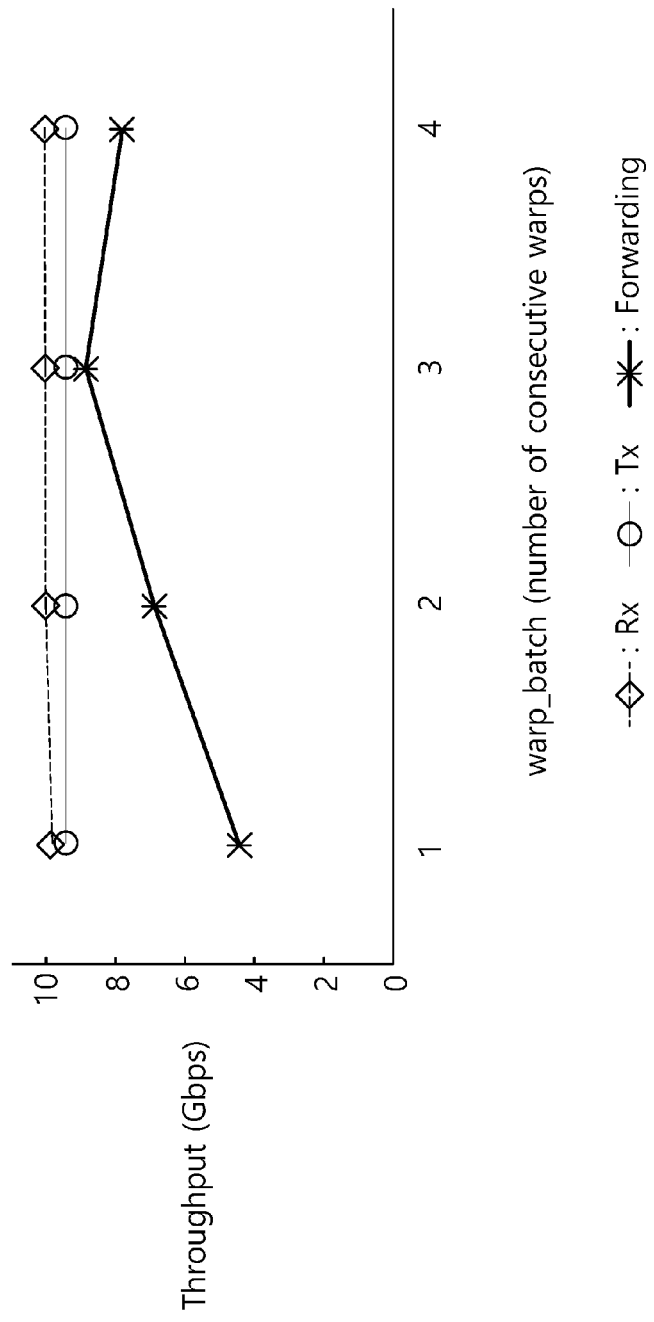
[FIG. 11]

[FIG. 12]

| Configuration | Elapsed time (ms) | Slowdown |
|---|---|---|
| Idle | 8023.4 | 100% |
| w/ DPDK | 23969.2 | 298.74% |
| w/ GPU-Ether | 8078.4 | 100.69% |

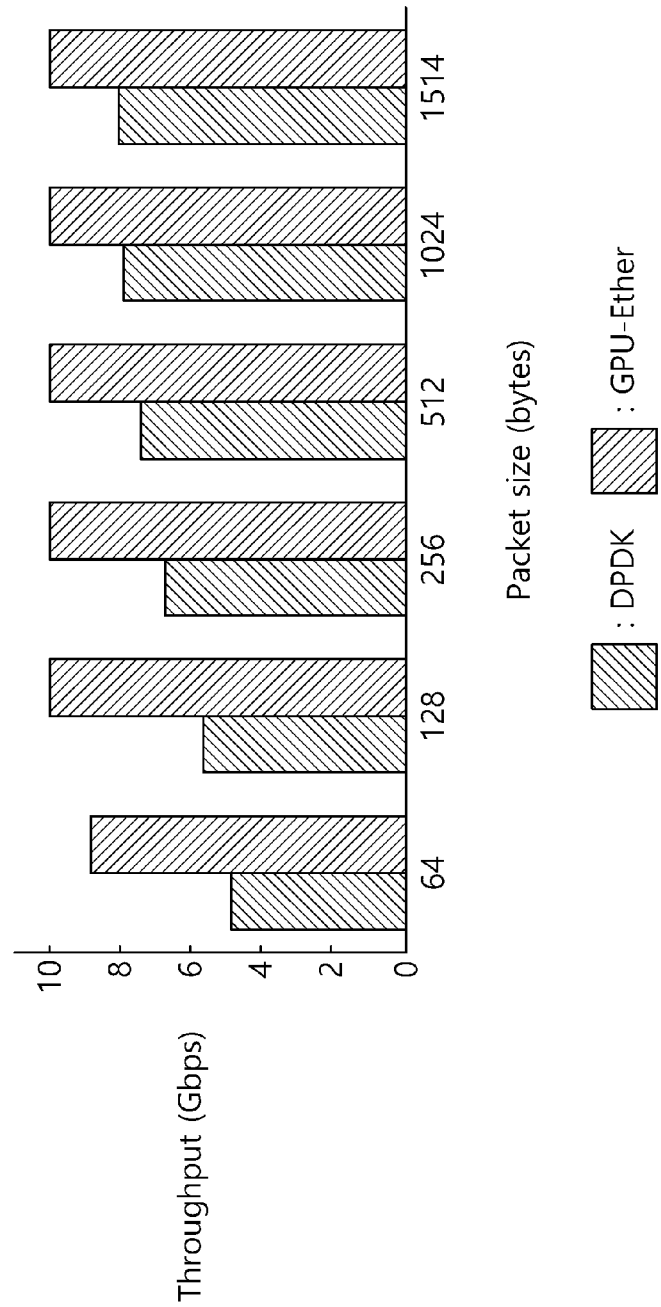
[FIG. 13]

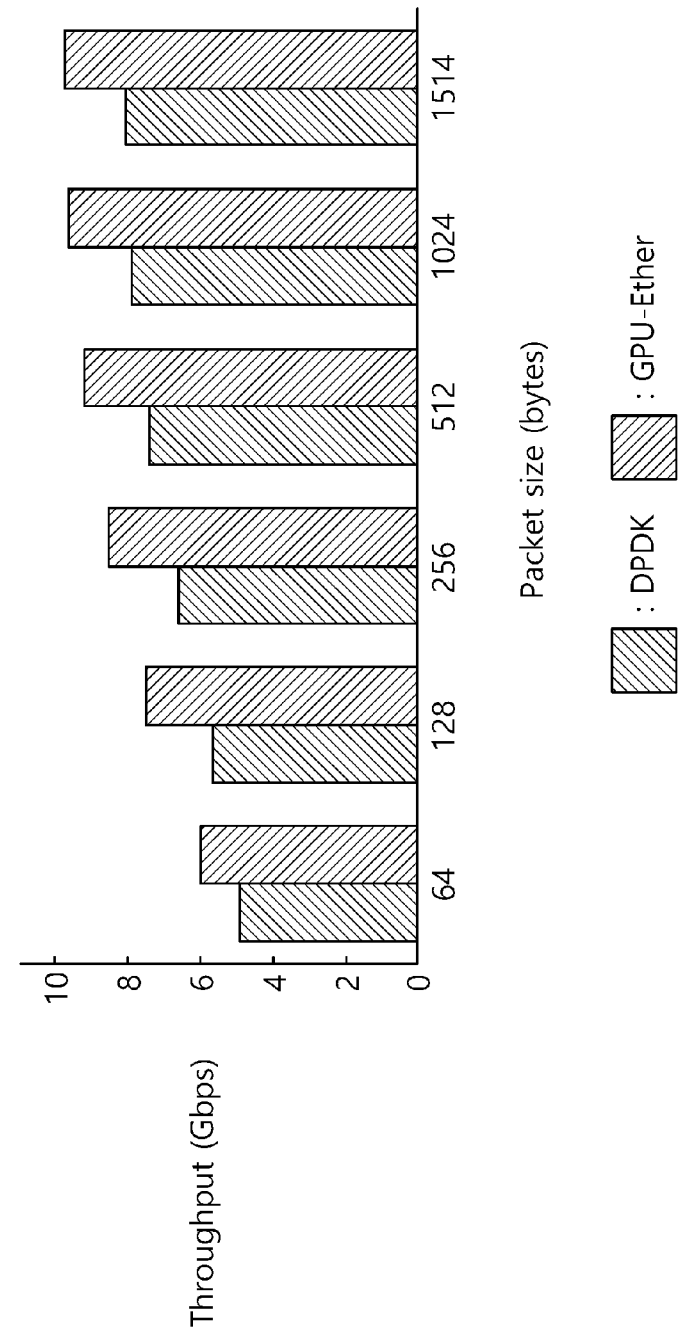
[FIG. 14]

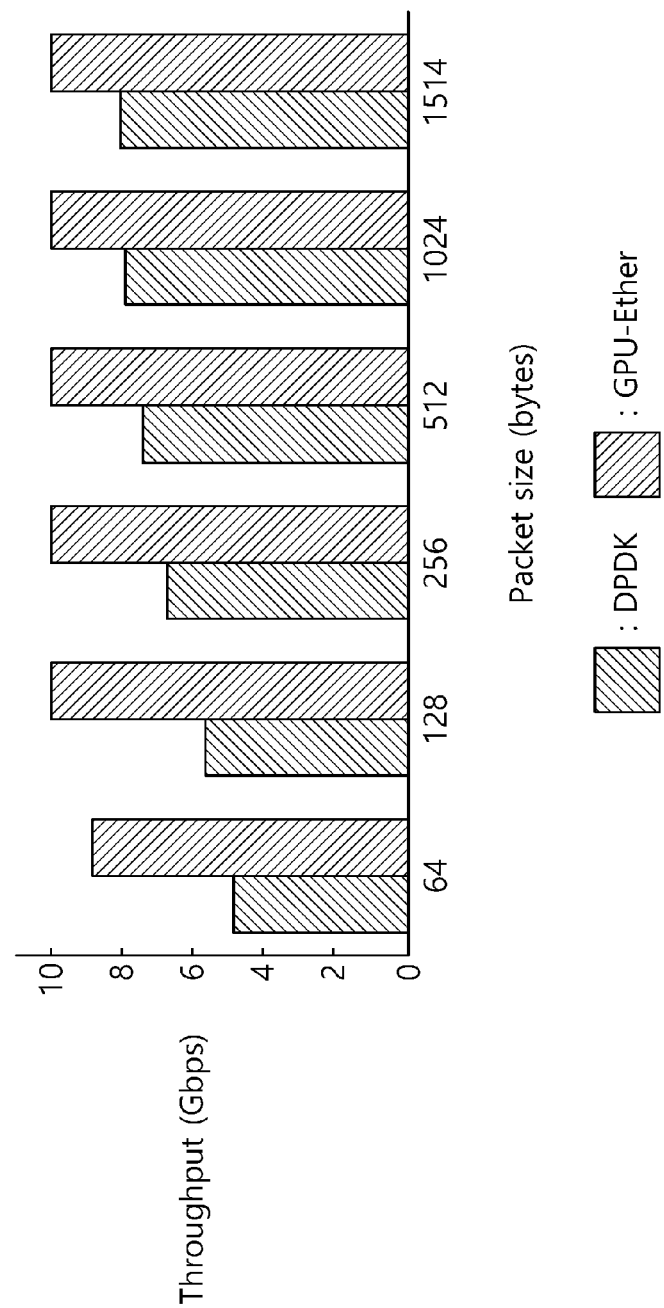
[FIG. 15]

GPU-NATIVE PACKET I/O METHOD AND APPARATUS FOR GPU APPLICATION ON COMMODITY ETHERNET

CROSS-REFERENCE TO RELATED APPLICATION(S)

This application is based on and claims priority under 35 U.S.C. 119 to Korean Patent Application No. 10-2021-0025097, filed on Feb. 24, 2021, in the Korean Intellectual Property Office, the disclosure of which is herein incorporated by reference in its entirety.

TECHNICAL FIELD

The disclosure relates to a method and device for inputting and outputting packets inside a GPU based on a commodity Ethernet device.

DESCRIPTION OF RELATED ART

Graphics processing units (GPUs) have become the most popular accelerators in recent years. By their enormous parallel processing capacity and large memory bandwidth, GPUs have brought great performance enhancement in applications with a lot of computation/memory access and are currently in use for various purposes, such as acceleration of current network functions (software routers, firewalls, etc.), distributed deep learning, and scientific computing, such as for research on COVID-19. Accordingly, servers in many data centers and high-performance computing (HPC) environments are mostly equipped with GPUs.

Various research efforts have been conducted to achieve performance enhancement related to GPU acceleration. In the meantime, when multiple GPUs are used to achieve greater acceleration (parallel processing performance), networking overhead may cause serious performance degradation. Since the number of GPUs that may be installed in one server is limited, multiple GPU servers need to be connected through a network, in which case a bottleneck may occur in the network.

To address the network loads on using accelerators (e.g., GPUs), a proprietary protocol or a special network interface controller (NIC) may be used or offloading the networking I/O to the SmartNIC or programmable NIC method may be adopted. There is also ongoing extensive research, such as optimization of network protocols, such as MPI (MPI is a communication protocol mainly used in GPU parallel computing environment) or providing efficient network I/O based on remote direct memory access (RDMA).

Among them, the latest studies on network I/O optimization have been mainly based on dedicated hardware, such as RDMA HCA (dedicated NIC for communicating in an RDMA scheme) or NetFPGA or SmartNIC. However, current data centers and cloud areas are mostly composed of general commodity Ethernet equipment, and it seems impossible to quickly replace them with dedicated hardware in all the areas to enhance their performance (to that end, costs and a change in infrastructure are required). A more realistic alternative is to use kernel-bypass I/O, but this is not realistic either because it takes a lot of time and effort due to the need for implementing complex pipelining and considering various tunings.

For example, to run a GPU application in a multi-GPU environment where multiple GPUs are connected through a network, it needs to put the data transferred from the network into the GPU memory. This is because, after locating the data in the GPU memory, the GPU application may run and process it as a target. In this case, the most basic process is to receive data via UDP/TCP using the socket of the OS (store in the host memory, DRAM) and then copy it back to the GPU memory one by one. During this course, two major loads occur. One occurs where UDP or TCP is used when using the socket. As UDP/TCP protocol processing occurs in the OS kernel, delay increases due to multiple times of copying and system call invocation. Bypassing this route is the kernel-bypass method described above. In the disclosure, DPDK, which is a representative kernel-bypass method, is used.

The second load occurs in the process of individually copying each packet from the host memory (DRAM) to the GPU memory. If each packet is received and copied into the GPU memory, a delay is added for each packet, which greatly reduces performance. Thus, a technique called Batching is used. This way is to copy a bundle of packets into the GPU memory. The overhead is eliminated by intermittently invoking a copy call whenever a certain level of packets are gathered. In such a case, however, the inside of the GPU stands idle, just waiting, while packets are gathered. This causes inefficiency. To address this issue, the concept of pipelining has been introduced. By pipelining, the bundle of packets previously received are computed inside the GPU while a predetermined level of packets are (simultaneously) gathered from outside the GPU and put into the GPU. In other words, while packets of the current turn are gathered outside the GPU, the packets of the previous turn are processed inside the GPU. This technique enables both the sides to work and is called pipelining. This may continue without a halt on either side until the program terminates. However, this way requires harmony between the two sides and tuning, to the current environment, of the degree of gathering packets, the time of copying, and the time of processing inside the GPU. So required are efforts to implement and tune complicated pipelining Such tuning is too significantly affected by network equipment and protocol performance and methods as well as application logic to be approached by common users who are not professional researchers of OS, network systems, and protocols.

As such, network processing for general GPU applications goes through a process in which network traffic is copied one by one to the GPU memory through the DRAM of the host. This increases delay and complicates implementation.

SUMMARY

According to embodiments of the disclosure, there is provided a GPU internal packet input/output method and device based on a commodity Ethernet device for providing packet I/O inside the GPU so that the GPU may directly access the network in a commodity Ethernet device environment.

According to embodiments of the disclosure, there is provided a GPU internal packet input/output method and device based on a commodity Ethernet device, which may significantly reduce delay time by directly transferring network packets to the GPU memory to thereby remove the heavy memory copying process and may allow host applications using the CPU to maximally use CPU resources by avoiding use of the CPU.

The disclosure is not limited to the foregoing embodiments but various modifications or changes may rather be made thereto without departing from the spirit and scope of the disclosure.

According to an embodiment of the disclosure, there may be provided a method for commodity Ethernet device-based graphic processing unit (GPU) internal packet input/output performed by a GPU internal packet input/output device, comprising being allocated an available packet buffer from a memory pool inside a GPU, after packets received from a network interface controller (NIC) are directly transferred to the allocated packet buffer, processing the directly transferred packets through a reception (Rx) kernel, transmitting a transmission packet to a network through the NIC according to an operation of a transmission (Tx) kernel, and returning the allocated packet buffer.

The method may further comprise performing initialization by setting a memory pool and a ring descriptor to a GPU memory through peer to peer direct memory access (P2P-DMA) and setting a doorbell register in the GPU memory through two-step mapping.

DMA addresses in a GPU memory pool may replace packet buffer addresses which a driver of the NIC previously holds when being initialized through an offset computation process.

The reception kernel may update information for a ring descriptor related to the directly transferred packets.

The received packets may be directly transferred to a packet buffer in the GPU memory through P2P-DMA.

Each GPU thread may be one-to-one mapped with a ring descriptor so that each thread is in charge of one descriptor.

The memory pool may be divided into a plurality of mini-memory pools independent for each of GPU threads. When the GPU threads access the memory pool, the GPU threads may access different mini-memory pools.

Each GPU kernel may have a unique identity (ID). Only a kernel having a unique ID matching an ID written in a status_register field of a specific packet buffer may access a corresponding buffer.

The unique ID may not be allocated to the reception kernel.

Warps performing packet processing may perform sequential packet processing sequentially from the first to last warp.

A warp batch including a plurality of warps which increase warp units simultaneously processable may be determined as a default operation execution unit of a GPU packet I/O.

Transmitting the transmission packet to the network may include transmitting the transmission packet to the network through the NIC according to an operation of updating descriptor information by the transmission kernel and an operation of accessing a doorbell register.

According to another embodiment of the disclosure, there may be provided a graphic processing unit (GPU) internal packet input/output device based on a commodity Ethernet device, comprising a network interface controller (NIC) connecting to a network to transmit/receive packets, a memory pool including a plurality of packet buffers in a GPU memory, a reception (Rx) kernel allocated an available buffer from a memory pool in a GPU and, after packets received from the NIC are directly transferred to the allocated packet buffer, processing the directly transferred packets through a reception (Rx) kernelr, and a transmission (Tx) kernel transmitting a transmission packet to a network through the NIC and returning the allocated packet buffer.

The reception kernel and the transmission kernel may be initialized by setting a memory pool and a ring descriptor to a GPU memory through peer to peer direct memory access (P2P-DMA) and setting a doorbell register in the GPU memory through two-step mapping.

DMA addresses in a GPU memory pool may replace packet buffer addresses which a driver of the NIC previously holds when being initialized through an offset computation process.

The reception kernel may update information for a ring descriptor related to the directly transferred packets.

The received packets may be directly transferred to a packet buffer in the GPU memory through P2P-DMA.

Each GPU thread may be one-to-one mapped with a ring descriptor so that each thread is in charge of one descriptor.

The memory pool may be divided into a plurality of mini-memory pools independent for each of GPU threads. When the GPU threads access the memory pool, the GPU threads may access different mini-memory pools.

Each GPU kernel may have a unique identity (ID). Only a kernel having a unique ID matching an ID written in a status_register field of a specific packet buffer may access a corresponding buffer.

The unique ID may not be allocated to the reception kernel.

Warps performing packet processing may perform sequential packet processing sequentially from the first to last warp.

A warp batch including a plurality of warps which increase warp units simultaneously processable may be determined as a default operation execution unit of a GPU packet I/O.

Transmitting the transmission packet to the network may include transmitting the transmission packet to the network through the NIC according to an operation of updating descriptor information by the transmission kernel and an operation of accessing a doorbell register.

According to another embodiment of the disclosure, there may be provided a non-transitory computer-readable storage medium for storing instructions that, when executed by a processor, enable the processor to execute a method, the method comprising being allocated an available packet buffer from a memory pool inside a GPU, after packets received from a network interface controller (NIC) are directly transferred to the allocated packet buffer, processing the directly transferred packets through a reception (Rx) kernel, transmitting a transmission packet to a network through the NIC according to an operation of a transmission (Tx) kernel, and returning the allocated packet buffer.

The disclosed technology may have the following effects. It should be noted that a specific embodiment of the disclosure need not include all of the objectives or effects set forth herein and the scope of the disclosure should not be limited thereto or thereby.

According to embodiments of the disclosure, it is possible to provide packet input/output (I/O) inside the GPU to allow the GPU to directly access the network in a commodity Ethernet device environment.

According to embodiments of the disclosure, it is possible to significantly reduce delay time by directly transferring network packets to the GPU memory to thereby remove the heavy memory copying process and may allow host applications using the CPU to maximally use CPU resources by avoiding use of the CPU.

Embodiments of the disclosure may support GPU-direct networking based on a commodity Ethernet device, as does a dedicated device, thus allowing for a low delay time, high bandwidth, and simplified implementation even without expensive dedicated equipment.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 1 is a view illustrating a configuration of a commodity Ethernet device-based GPU-internal packet input/output device according to an embodiment of the disclosure;

FIG. 2 is a view illustrating a continuous packet I/O processing process in persistent kernel threads;

FIG. 3 is a view illustrating parallelism enhancement in packet processing;

FIG. 4 is a view illustrating a mini memory pool per GPU for lock-free memory pool access;

FIGS. 5 and 6 are views illustrating an initialization process of a packet input/output device according to an embodiment of the disclosure;

FIGS. 7 and 8 are views illustrating packet transfer processing in two different packet I/Os used for evaluation;

FIG. 9 is a view illustrating reception and transmission performance according to various packet sizes;

FIG. 10 is a view illustrating a comparison in packet forwarding performance per packet size between a conventional DPDK and an embodiment of the disclosure;

FIG. 11 is a view illustrating the performance according to various warp batch sizes;

FIG. 12 is a view illustrating interference with a host (CPU)-side application operating on the same server; and FIGS. 13 to 15 are views illustrating the performance of various network applications.

DETAILED DESCRIPTION

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure. When determined to make the subject matter of the disclosure unclear, the detailed description of the known art or functions may be skipped.

The terms "first" and "second" may be used to describe various components, but the components should not be limited by the terms. The terms are used only to distinguish one component from another.

The terms as used herein are provided merely to describe some embodiments thereof, but not to limit the disclosure. For use in embodiments of the disclosure, common terms widely used as possible have been chosen considering functions in the disclosure, but the terms may be varied depending on the intent of one of ordinary skill in the art or case laws or the advent of new technologies. In certain cases, some terms may be arbitrarily selected by the applicant, and in such case, their detailed definitions may be given in the relevant parts thereof. Accordingly, the terms used herein should be determined based on their meanings and the overall disclosure, rather than by the terms themselves.

As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, various embodiments are described below with reference to the accompanying drawings and, in describing embodiments in connection with the drawings, the same reference denotations are used to refer to the same or similar components, and no duplicate description is presented.

One embodiment of the disclosure includes a software architecture and implementation that enables GPU-direct networking even on commonly used commodity Ethernet network equipment (NICs and switches).

According to an embodiment of the disclosure, there is provided a commodity Ethernet device-based GPU-internal packet input/output method and device that enables commodity Ethernet device-based GPU-direct networking, rather than GPU-directRDMA (which directly transfers to the GPU memory without passing through the host DRAM) based on expensive dedicated hardware.

To this end, an embodiment of the disclosure utilizes P2P-DMA technology for direct transfer of network traffic between the network card (NIC) and the GPU memory and allows the GPU to directly process its own traffic using a persistent kernel, thereby avoiding use of the CPU altogether.

The advantages of one embodiment of the disclosure are discussed.

First, an embodiment of the disclosure has a very low delay because direct networking access from the GPU is possible. In an embodiment of the disclosure, the traffic flowing in from the network is transferred directly to packet buffers pre-allocated in the GPU memory via to the P2P-DMA scheme, and GPU applications (from the NIC) may thus access the data in the GPU memory immediately without waiting for data copying from the host. In an experiment of comparison in RTT (round-trip time, measure the time consumed for a round trip of packets and compare delay times of entry into or exit from the GPU through the network) with other communication schemes available in a current normal commodity Ethernet environment, an embodiment of the disclosure shows a minimum level of delay that is achievable in a commodity Ethernet environment.

One embodiment of the disclosure may eliminate the intervention of the CPU. In one embodiment of the disclosure, a dedicated persistent kernel (a kind of infinite loop or daemon) for packet I/O processing is placed in the GPU to directly process network traffic for the GPU, so the CPU is not used at all. Thus, the CPU cores (used for packet I/O processing and data copying between DRAM and GPU memory) that were used for processing network traffic in and out of the GPU are freed. Another advantage is that the network traffic does not go through the DRAM, so the CPU's cache is not tainted. When using the normal Linux network stack or Kernel-bypass I/O, network traffic goes to the DRAM and is then copied to the GPU memory so that taint of the CPU cache thereby is unavoidable. One embodiment of the disclosure may dramatically eliminate the cache taint of the CPU.

An embodiment of the disclosure may provide simpler GPU network programming. The direct packet I/O provision according to an embodiment of the disclosure allows many developers to more easily apply high-performance GPU network acceleration to applications. Developers no longer need to consider complex pipelining through repetitive and tedious tuning tasks (a process of eliminating idle time by superposing data transfer between DRAM and GPU memory and processing inside the GPU as much as possible) to obtain a high-performance network.

To obtain the above advantages and perform packet I/O directly within the GPU, an embodiment of the disclosure has addressed the following issues.

An embodiment of the disclosure may solve the need for sequential processing on a GPU parallel architecture. While packet I/O is based on sequential processing, GPUs are optimized for parallel processing. The GPU obtains maximum performance by executing a large number of GPU threads in parallel at the same time. Every 32 GPU threads run concurrently in units called warp (in the case of Nvidia's GPU) by 32 (these 32 threads simultaneously execute the same command on data in different GPU memories). In this case, sequentially is not guaranteed for warp scheduling. Meanwhile, it is assumed that commercial NICs generally use a ring descriptor data structure for packet I/O and access to them sequentially proceeds. Therefore, to directly perform packet I/O within the GPU, it is essential to consider the inconsistency between the architectural characteristics (parallelism) of the GPU hardware and the characteristics (sequentiality) of the packet I/O.

An embodiment of the disclosure may solve the issue that the lock in units of threads is not supported in the GPU. An embodiment of the disclosure previously allocates a memory pool containing packet buffers on the global memory of the GPU and allows GPU threads to utilize them. In the process of allocating the packet buffer, as described above, multiple GPU threads are simultaneously scheduled and operated (warp, 32 threads above), so that they simultaneously access the memory pool and, at this time, a lock is needed for sequential access. However, current GPUs support warp-unit or thread block-unit locks but not thread-unit locks that are required for GPU-Ether. Further, if a thread-unit lock is implemented in the same manner as that used in the CPU in the GPU, a live-lock may be highly likely to occur.

An embodiment of the disclosure may solve the overhead caused by frequent communication between the CPU and the GPU. The processing of packet I/O entails updating of consistent ring descriptor information and accessing doorbell registers. Originally, access to these ring descriptors and doorbell registers occurs on the NIC driver operating in the kernel area of the host memory (DRAM). If an implementation is made without dealing with this, ceaseless communication between the GPU memory actually receiving packets and the NIC driver on the CPU side processing progress information therefor (ring descriptor and doorbell register) is required, which complicates the implementation and increase delay and loads.

FIG. 1 is a view illustrating a configuration of a commodity Ethernet device-based GPU-internal packet input/output device according to an embodiment of the disclosure.

Referring to FIG. 1, a GPU internal packet input/output device 100 based on a commodity Ethernet device according to an embodiment of the disclosure may include a network interface controller (NIC) 110, persistent kernels 120 including a reception (Rx) kernel 121 and a transmission (Tx) kernel 122, and a GPU memory 130 including a memory pool 131. However, not all of the illustrated components are essential components. The GPU internal packet input/output device 100 may be implemented by more components than the illustrated components, or the GPU internal packet input/output device 100 may be implemented by fewer components.

Hereinafter, a detailed configuration and operation of each component of the GPU internal packet input/output device 100 of FIG. 1 is described.

The two persistent kernels 120 inside the GPU include the reception (Rx) kernel 121 and the transmission (Tx) kernel 122 responsible for reception (Rx) and transmission (Tx), respectively. Received packets may be transferred directly to the packet buffer in the GPU memory through P2P-DMA. The reception kernel (Rx-kernel) 121 updates the information for the related ring descriptor. Basically, GPU applications may directly access (zero-copy) packet data that has entered the same GPU memory but, as necessary, copy the packet data in the application buffer and use it. When a packet to be transmitted is ready, the transmission kernel (Tx-kernel) 122 similarly updates the relevant descriptor information and accesses the doorbell register, thereby sending the packet to the actual network. Then, the persistent kernels 120 return the used packet buffer back to the memory pool 131.

The main components of the GPU internal packet input/output device 100 according to an embodiment of the disclosure are described.

First, the memory pool 131 includes a plurality of packet buffers. The memory pool 131 of the GPU internal packet input/output device 100 refers to a pool of available packet buffers. The memory pool 131 is previously allocated in the GPU global memory to store packets coming in/out of the GPU. When the packet input/output device 100 is initialized through an appropriate offset computation process, the DMA addresses of the GPU memory pool 131 replace the existing packet buffer addresses (set in the DRAM) that are possessed by the NIC driver. This makes it possible for the NIC 110 to directly transfer network traffic to the GPU memory 130. Since the DMA-capable addresses of the packet buffer allocated to each descriptor need to be set every time a new packet comes in or goes out, the persistent kernels 120 inside the GPU are responsible for this task. The data structure of the packet buffer is a fixed-size object and consists of fixed-size memory areas that may contain necessary metadata and packet data itself.

Next, the ring descriptor and doorbell registers are described.

To directly process packet I/O in the GPU, the GPU internal packet input/output device 100 maps the Rx/Tx ring descriptors and doorbell registers of the NIC driver to the GPU memory. To perform a role as the NIC driver with the GPU internal code, they are mapped in two different schemes, a general mmap+CUDA mapping (doorbell register) and a P2P-DMA (ring descriptor) scheme. The reason for selecting such different mapping schemes is described below. The GPU threads in the persistent kernel 120 are connected to the descriptors in a one-to-one correspondence, and each GPU thread updates information for its own descriptor. Access to the parallel doorbell registers is only allowed to the last thread in each warp (a collection of 32 GPU threads running concurrently) to minimize overhead. Therefore, whenever every 32 (warp unit) packets are processed, the last GPU thread in the warp informs the NIC of the processing of these 32 packets.

FIG. 2 is a view illustrating a continuous packet I/O processing process in persistent kernel threads.

Two persistent kernel threads enable packet I/O running on the GPU. Their main task is to receive an allocation of packet buffers or return them. Fetching an available packet buffer from the memory pool 131 is referred to as allocation and the opposite is referred to as return. Information for the descriptors the GPU threads in the persistent kernels 120 are responsible for is updated, and the NIC is controlled through doorbell register access. Meanwhile, the doorbell registers need to always be accessed sequentially, according to the NIC's operating mechanism. However, the scheduling of the warp scheduler of the GPU (the order in which the threads in the GPU, tied in warp units, are scheduled) is not sequential. This situation may cause abnormal behavior in receiving and transmitting packets.

To address this issue, an embodiment of the disclosure allows only warp-unit threads to process packets at every moment. As illustrated in FIG. 2, the warps that process packets perform sequential packet processing while circulating from the first warp in the kernel to the last warp.

FIG. 3 is a view illustrating parallelism enhancement in packet processing.

Since the architecture of the GPU is optimized for parallel processing, processing in a single warp unit as described above may significantly reduce performance. To avoid such performance degradation, an embodiment of the disclosure uses a warp_batch that increases warp units capable of simultaneously processing packet I/O as illustrated in FIG. 3. By so doing, an embodiment of the disclosure achieves a parallelism above a certain level while maintaining sequentiality. Through ample tests on various batch sizes, one embodiment of the disclosure may determine 128 (four consecutive warps) as a default batch size considering the trade-off between GPU thread scheduling and performance. Through this optimization, an embodiment of the disclosure may achieve significant performance enhancement in packet forwarding situations.

FIG. 4 is a view illustrating a mini memory pool per GPU for lock-free memory pool access.

For example, an embodiment of the disclosure may previously allocate a memory pool capable of storing a total of 2,048 packet buffers, and this number may be changed in an initialization step of the packet input/output device 100. In general, packet I/O operating on the host side (CPU) is sequentially performed while looping in one thread on the ring descriptor and the packet buffer. However, in the case of the packet input/output device 100 in which a plurality of GPU threads need to be simultaneously operated, requests for access to the packet buffer may be simultaneously generated, so a lock operation for them is essential. However, in the current CUDA architecture, only lock in warp units or thread block units is supported, and thread unit-lock is impossible. Further, a lock in the CUDA architecture greatly degrades the work performance of GPU threads, and there is also a risk of generating a live-lock. To solve this problem, the packet input/output device 100 divides the memory pool into small mini-memory pools independent of each GPU thread as illustrated in FIG. 4, allowing the GPU threads to access different (non-overlapping) areas when accessing the memory pool and hence eliminating the need for a lock.

An implementation of the GPU internal packet input/output device 100 according to an embodiment of the disclosure is described.

In the implementation of the packet input/output device 100, the GPUDirectRDMA API is used for the P2P-DMA function between the NIC and the GPU. Further, preemption in command units may be supported for other GPU applications and the packet input/output device 100, which operates in the form of a persistent kernel, to simultaneously operate.

The operation of the packet input/output device 100 inside the GPU is described as follows.

As an example, it was shown that a sufficient performance was achieved when one GPU thread is allocated for processing one packet and, when more threads are allocated for each packet, inefficiency is rather caused due to synchronization overhead between the threads. In the packet input/output device 100, two kernels (Rx and Tx) each include 512 GPU threads, and each GPU thread is one-to-one mapped to the ring descriptor (each thread has one descriptor in charge). This number '512' is the same as the default number of descriptors for the 10 GbE NIC driver (ixgbe). Since the two kernels (Rx and Tx) are executed in independent CUDA streams, they operate simultaneously (when executed in independent CUDA streams, they utilize may be simultaneously executed using separate command queues according to the Hyper-Q hardware support inside the GPU).

Next, a scheme for determining the owner of the packet buffer is described.

Since each GPU thread in the packet input/output device 100 has an independent mini-memory pool, normally, the packet buffer is not shared among the threads within one kernel. However, if a packet is transferred from one kernel (GPU application) to another kernel, the packet input/output device 100 uses a sharing scheme to allow both the kernels to access the corresponding packet buffer space. Here, the packet input/output device 100 performs a buffer sharing scheme (zero-copy) between different kernels to maintain a shorter delay. A simple scenario is described to help understand the above case. The reception (Rx) kernel or transmission (Tx) kernel of the packet input/output device 100 that processes packet I/O is also a GPU process, and the applications that will actually do some tasks on the packets to be received or transmitted are also separate GPU processes. For example, they mean software routers or IPSec gateways appearing in the evaluation of an embodiment of the disclosure. For example, after the reception (Rx) kernel receives a packet from the network and stores it in the packet buffer on the GPU memory, the packet buffer containing the packets received by the software router kernel which is the other kernel in the same GPU is accessed. Then, after comparing (lookup) the header part of the packet with a routing table previously stored in the GPU memory, a task (application task) to determine the network port for sending the packet is performed. Therefore, to determine the current owner of the corresponding buffer in a situation where multiple kernels need to share one packet buffer, an embodiment of the disclosure adds a field called status_register to the metadata part of the packet buffer, thereby indicating the ID of the current owner. The owner of the packet buffer is some thread in the transmission (Tx) kernel or some thread in another application kernel. The owner of the packet buffer is limited to one at a time.

Each GPU kernel has a unique ID, and only kernels with a unique ID value that matches the ID value written in the status_register field of a particular packet buffer may access that buffer. In this case, the reception (Rx) kernel always fetches the packet buffer only from the memory pool but does not receive a packet buffer from the other kernel and, thus does not need a unique ID value so does not allocate one. When the first packet buffer is allocated from the memory pool, the status_register value is initialized to 0. When a newly received packet comes in this packet buffer, the status_register value of this packet buffer is changed to the unique ID of the kernel that will process the packet in this packet buffer, and only threads within the kernel may perform a task on the packet. Here, the unique ID is for the kernel, not for each thread. Because the unique ID determines a specific kernel, the specific kernel has the ownership to the packet buffer containing the packet to be processed, and multiple GPU threads in the kernel may be allocated to the buffer to be utilized for processing of one packet. Finally, after processing and transmission of the packet is completed, this packet buffer may be returned to the memory pool and, at this time, the status_register value of this packet buffer is reset to 0.

In an example scenario, it is assumed that there are three persistent kernels containing the same number of GPU threads. These are a reception (Rx) kernel, a software router kernel (1), and a Tx kernel (2). The values in parentheses are the respective unique ID values of the kernels, and the reception (Rx) kernel does not have a unique ID value as described above. Each GPU thread in the reception (Rx) kernel fetches a packet buffer from its respective mini-memory pool at the start and is in standby state. Afterwards, if thread no. 4 in the reception (Rx) kernel receives a packet, this thread changes the status_register value of the corresponding packet buffer to 1 (unique ID of the router kernel). Then, thread no. 4 of the router kernel becomes the owner of the packet buffer and performs a task on the packets in the buffer. After all packet processing is finished, thread no. 4 of the router kernel changes the status_register value of the buffer to 2, and thread no. 4 of the Tx kernel with the same unique ID prepares for packet transmission including the ring descriptor for the packet and export it to the network. In such a manner, an embodiment of the disclosure was able to quickly and easily implement network applications operating in a persistent kernel scheme, and existing GPU applications is scheduled to be supported through modifications to related APIs.

The reception (Rx) kernel is discussed. Each thread in the Rx kernel identifies that a packet enters the GPU memory by polling the Descriptor Done field of the reception (Rx) descriptor it is responsible for (the field is generally referred to as the DD field and is a value to be set if the NIC hardware receives a packet. The NIC driver identifies reception of the packet based on the value set by the NIC hardware and performs its corresponding process). When the reception (Rx) kernel starts, each thread is allocated a packet buffer from its own mini-memory pool, attaches it to the ring descriptor it is responsible for, and waits for a packet to arrive. The thread in the reception (Rx) kernel, which identifies packet reception based on a change in the DD field of the descriptor, sets the status_register value of the corresponding packet buffer to the unique ID of the kernel to process the packet and passes the authority to allow the next kernel to process the packet immediately (e.g., Tx kernel or other network application kernels). After passing the buffer containing the received packet to another kernel, the thread is again allocated a new buffer from the mini-memory pool ad sets it in the descriptor in the above-described manner and waits for a new packet to come in. In this case, since the thread is in the state of having passed the packet buffer to the next kernel and set a new buffer in the descriptor, but the descriptor is aware of the state of having received the packet, it is turned into a state in which it may receive a new packet by initializing the descriptor.

The above tasks may be executed simultaneously and in parallel in all threads in the currently scheduled warp_batch and, if all the threads in warp_batch complete the above tasks, the last thread in this warp accesses the doorbell register and informs the NIC of it. At the same time, the last thread of the current warp transfers the processing authority for packet I/O to the next warp_batch (sequential progress). For such sequential progress, a branching statement (conditional statement) (e.g., if statement) is required within the GPU code, and only warp_batch to be currently worked through this conditional statement performs packet I/O operations. While the threads corresponding to the warp_batch corresponding to this conditional statement perform packet I/O, most of other threads that do not meet this condition are in the standby state. A synchronization task is required after branching through a syncthreads command so that the threads having performed packet I/O may again enter the standby state with them.

On the other hand, since such post-branching synchronization task drastically degrades the performance of the persistent kernel, one embodiment of the disclosure may minimize the synchronization task in this kernel. As a result, in the reception (Rx) kernel, synchronization statements are contained only in two places, e.g., the start part where the loop of the persistent kernel starts and a point right after doorbell register access is initiated after the current warp_batch finishes all the tasks.

The transmission (Tx) kernel is discussed. The transmission (Tx) process proceeds in a similar manner to the reception (Rx) process. However, this is a little more complicated because, unlike the reception (Rx) side, the interface between Packet I/O and NIC operates in an asynchronous manner. In the reception (Rx) process, if a new packet arrives, the NIC hardware marks the corresponding descriptor as DD, and the GPU thread identifies this and passes the packet buffer connected to the descriptor while immediately initializing the descriptor. In contrast, in the transmission (Tx) process, there is a time difference between when the GPU thread sets packet transmission-related information in the descriptor and when the actual NIC hardware sends a packet to the network. Thus, the transmission (Tx) kernel had to be composed of two main parts: one part for identifying the DD setting to identify the state in which that the NIC hardware may reuse the transmission (Tx) descriptor, and the other part for setting a new packet to be sent out to the network in the reusable descriptor.

If the transmission (Tx) kernel starts, GPU threads in the kernel identify the DD field to secure the currently available descriptors. The threads that have identified that the DD field was set in this way may initialize the descriptor (clean) and then return the packet buffers linked with the descriptor to the mini-memory pool (for future reuse). The reason why this process is possible is that the DD field set in the transmission (Tx) descriptor means that the NIC hardware identifies that all tasks to be identified in the hardware for the corresponding descriptor are finished and may be reused. Then, the threads belonging to the current warp_batch identify whether there is a buffer whose status_register was set with its (Tx kernel) unique ID among the packet buffers in their respective mini-memory pools.

If such a buffer is found, it fetches the buffer, connects it to the descriptor, and then updates the information required in the descriptor to send the packet in the packet buffer to the network. If all the threads of the current warp_batch complete the above tasks, the last thread of the current warp_batch accesses the doorbell register to instruct the NIC to send packets to the network because the packets are ready.

Another option that may be considered is to implement both the reception (Rx) kernel and the transmission (Tx) kernel as functions, rather than separate kernels, and invoke them in one persistent kernel. This allows less GPU resources to be used and may allocate more resources to other GPU applications. If so doing, the reception (Rx) and transmission (Tx) processes may be sequentially performed. In other words, since the thread receiving the packet is also responsible for transmission of the packet, a simplified implementation is possible and, as described above, there is no need for a process for changing the owner of the buffer between the reception (Rx) kernel and the transmission (Tx) kernel. However, reception (Rx) and transmission (Tx) may not occur simultaneously. Thus, an embodiment of the disclosure separates the reception (Rx) kernel and transmission (Tx) kernel, thereby allowing reception (Rx) and transmission (Tx) to occur simultaneously without affecting each other and hence preventing degradation of (asynchronous) performance.

FIGS. 5 and 6 are views illustrating an initialization process of a packet input/output device according to an embodiment of the disclosure.

The initialization process of the packet input/output device 100 performs an initialization process (excludes the CPU) for direct interaction between the GPU and the NIC before the persistent kernel inside the GPU that processes the packet I/O operates. This operation is performed only once at first, and all subsequent operations are performed by the GPU kernel.

FIG. 5 illustrates a process of setting a memory pool and a ring descriptor in the GPU memory through P2P-DMA.

First, the host side of the packet input/output device 100 (the code part operating on the CPU, which is involved only in initialization) holds the memory pool and descriptor in the GPU memory through the cudaMalloc command (S101) and then notifies the NIC driver of their addresses and sizes through an ioctl system call (S102). The NIC driver obtains the DMA-capable address using the nvidia_p2p_get_pages command (S103) of the GPUDirectRDMA API for the received addresses. The DMA-capable address obtained for the memory pool is transferred back to the Rx/Tx kernel, and accordingly, an appropriate offset operation is performed on the transferred address (the starting point of the memory pool address) in the GPU code so that DMA-capable addresses for packet buffers in all memory pools are accessible, and these may be known to the NIC driver. For the descriptor, DMA-capable addresses are set through the IXGBE_WRITE_REG macro (S104). Thereafter, the NIC may be managed through the descriptor held in the GPU memory (S105, S106). An embodiment of the disclosure activates only one transmission (Tx) and one reception (Rx) descriptor for convenience of implementation. This is sufficient to achieve 10 GbE network performance. In general, for 10 GbE NICs or higher-performance NICs, a hashing function called Receive-Side Scaling (RSS) is automatically supported in the NIC hardware for load balancing. An embodiment of the disclosure uses a method for forcing only one descriptor pair (Rx/Tx) to be activated using an ethtool command.

FIG. 6 illustrates a process of setting the doorbell register through two-step mapping.

The doorbell register is a space that exists on the NIC hardware (the memory pool and descriptor above exist on DRAM and are space in which a data structure is created in software and used by the NIC driver). The existing NIC driver may first map the doorbell register to a virtual address through an ioremap system call and then use it to use the same.

Meanwhile, unlike the conventional scheme of mapping the doorbell register to a virtual address of the DRAM in hardware, there is no method for directly mapping to the GPU memory in hardware. Thus, an embodiment of the disclosure performs a two-step mapping process as illustrated in FIG. 6. First, an embodiment of the disclosure maps the address, which has been remapped to the virtual address in the NIC driver (kernel area), to the user area, and then maps it to the GPU memory. An embodiment of the disclosure uses an mmap system call (S201) in the NIC driver to map the doorbell register to the user area. If the mmap function implemented in the user space is invoked, the NIC driver invokes the io_remap_pfn_range system call (S202) for the doorbell register address mapped to the virtual address and remaps it to the virtual address of the user space. Thereafter, the address mapped to the user area may be remapped to the GPU memory through the cudaHostRegister and cudaHostGetDevicePointer function call (S203) and may thus be accessed by the GPU kernels (S204).

Meanwhile, an evaluation of an embodiment of the disclosure is described.

The test environment is configured as follows. To evaluate the performance of an embodiment of the disclosure, two nodes were directly connected with a 10 Gbps Ethernet link (Intel X520-DA2 10GbE NIC) and the test was conducted on these nodes. Both the nodes (e.g., server PCs) have the same hardware and software settings, and the specifications are as follows. The CPU is Intel i7-6800K 3.4 GHz and supports 6 cores and hyper-threading. The host memory is 16 GB and operates at 2,133 MHz. The GPU uses Nvidia's Quadro P4000, which includes 14 streaming multiprocessors (SM) and 1,792 cores and is equipped with 8 GB of memory. The operating system is 64-bit Ubuntu 18.04.2 LTS version, and the kernel version is 4.18.15. The CUDA toolkit version is 10.1 and Nvidia driver version is 418.67. Finally, for testing purposes, DPDK-pktgen was used to generate network traffic at line-rate.

FIGS. 7 and 8 are views illustrating packet transfer processing in two different packet I/Os used for evaluation.

FIGS. 7 and 8 illustrate two packet I/O structures for performance comparison of networking methods for GPU. The use of DPDK and the use of one embodiment of the disclosure are shown. Here, the packet input/output device 100 according to an embodiment of the disclosure is referred to as GPU-Ether.

FIG. 7 illustrates the case of using DPDK and shows an example in which each received packet is stored in the rte_mbuf data structure allocated to the memory pool (located in DRAM) of DPDK. Since DPDK receives an allocation of rte_mbuf available in the memory pool and contains packets therein, they have a chance of being not sequentially stored in the memory (access is rapid when they are sequentially stored in the memory). To allow packets to be stored in sequential memory spaces, packets gathered at a predetermined level go through rearrangement before copied to the GPU memory. To that end, the master-worker thread model has been used as in conventional research. Worker threads are threads that perform packet I/O through DPDK, and the master thread serves to identify the packets transmitted/received by the worker threads while performing packet I/O and gather them and put/pull them in/out of the GPU. If the worker thread receives packets, the packets are copied in the queue of the master thread and are sorted, and the master thread copies them into the GPU memory. Packet transmission (sending out from the GPU memory) proceeds in the opposite way. Additionally, a 64-byte head room and tail room are put in each packet (meaning that a 64-byte space is secured at each of the head and tail of the packet) because the network application such as IPSec gateway has modified the packet in such a manner that a head and data are added before and after the original packet. The space in which data is received from the master queue of the host in the GPU memory is four times the master queue to previously secure a buffer for containing data to prevent the GPU from idling due to lack of data to process which arises from a difference in speed between both sides.

As illustrated in FIG. 8, according to embodiments of the disclosure, packets are directly transferred to the packet buffers on the GPU memory without any data copying (i.e., does not go through P2P-DMA, DRAM), and each thread in the GPU processes the packets that come in its respective mini-memory pool. GPU-Ether also has a headroom space in the packet buffer, and the metadata and the rest constituting it are arranged in 32 bytes and 128 bytes, respectively. (The reason why there is no mention of tail room is because the packet buffer used in the GPU is 2,048 bytes larger than the maximum packet size of 1,514 bytes in the first place, so there is room.) The reason for this arrangement is that performance is optimized when data on the GPU memory is arranged in the byte units in which the GPU hardware actually accesses the memory, and its influence was indeed identified.

In the reception (Rx) kernel and transmission (Tx) kernel, each GPU thread records the accumulated count of processed packets by invoking the atomicAdd function and accumulating the number of packets it has received or sent in the variable shared by all threads. The accumulated count is transferred every second through the cudaMemcpy function invocation to the host monitoring loop outside the GPU (which is additionally implemented as a code that outputs real-time performance on the screen while running an infinite loop for performance identification on the CPU side) and may thereby identify the processing bandwidth. The above test configuration is equally applied to all of the subsequent tests.

FIG. 9 is a view illustrating reception and transmission performance according to various packet sizes.

The packet I/O performance of an embodiment of the disclosure is as follows. Here, the packet input/output device 100 according to an embodiment of the disclosure is referred to as GPU-Ether. The most basic reception (Rx) and transmission (Tx) performance for each packet size of the packet input/output device 100 are shown. Each performance was measured independently. A look at the graph reveals that the packet input/output device 100 achieves the maximum line-rate (10 GbE) in reception (Rx) and transmission (Tx) situations for all packet sizes except for Tx (94%) for a 64-byte packet size. According to conventional studies, the actual bandwidth of a PCIe link drastically decreases when the TLP packets passing through the PCIe link decrease in number. PCIe refers to a PCI express link. Since the tests target the GPU as the final destination, and the GPU is a device that is plugged into a PCIe slot, data entering or exiting the GPU need pass through the PCIe link. The data passing through the PCIe link is also packetized and transferred like a kind of network, and this packet is different from the packet usually meant in the network industry (which passes through a LAN cable connected between different PCs). These packets that pass through the PCIe link are referred to as TLPs. Existing studies have proven and noted that, if the size of this packet is small, the PCIe link cannot be used efficiently and the overall performance drops sharply.

Meanwhile, in the packet input/output device 100 according to an embodiment of the disclosure, small control messages for accessing doorbell registers and descriptors pass through the PCIe link. For Tx, the direction in which data passes and the direction in which the control message passes are the same and they are thus influenced by each other. Eliminating communication between the host side and the GPU in the packet input/output device 100 may be a great contribution to an embodiment of the disclosure. This means that the necessary communication between the host-side DRAM and the GPU memory has been eliminated by implementing all necessary functions within the GPU to be performed independently. However, as mentioned above, there are still control messages passing through the PCIe link. This is why the GPU structure may not directly receive network packets through a LAN port. Since there is a separate NIC, even when the NIC hardware receives packets and transfers them directly to the GPU, the PCIe link is used for NIC-GPU transfer. Further, since the NIC having a LAN port is a separate device from the GPU hardware, a NIC driver for managing the NIC is required, and minimal communication between it and the packet input/output device 100 according to an embodiment of the disclosure is inevitable. Therefore, an embodiment of the disclosure may be more efficient when the GPU has a LAN port to directly receive network packets.

When the warp_batch size is 128 (as default), 108K times of access to the doorbell register and 13.9M times of access to the descriptor occur on GPU-Ether. It is determined to be a value sufficient to affect the bandwidth loss. In sum, since small TLP packets corresponding to doorbell and descriptor access pass in the same direction as the Tx data and PCIe link, the effective bandwidth of the PCIe link is significantly reduced and, even in transmission (Tx), this becomes 64B which is the situation of the smallest packets, leading to the worst case and resultantly reduced performance. Further, in the case of packet I/O operating on the basic host side, PCIe communication is performed only between DRAM and NIC, whereas in GPU-Ether, it may also be performed between the NIC and DRAM, and GPU, and it is thus determined that very complex influence may be had on the communication characteristics of PCIe traffic. However, it is a harsh test in performance test to fill the 10 GbE link with 64 bytes, and it needs to be noted that for normal sizes of packets actually used in networks, GPU-Ether achieves the maximum line rate.

FIG. 10 is a view illustrating a comparison in packet forwarding performance per packet size between a conventional DPDK and an embodiment of the disclosure.

In FIG. 10, packet forwarding performance is compared between two cases, one using an embodiment of the disclosure and the other using a conventional DPDK. Here, the packet input/output device 100 according to an embodiment of the disclosure is referred to as GPU-Ether. Packet forwarding refers to the performance of receiving packets at the maximum line-rate and sending them back to the other side as they are. To send a packet back to the other side, it is necessary to reverse both the source and destination recorded in the header of each packet. Thus, such a test is a very heavy test. The packets received in this test enter and exit the GPU in both the DPDK and the embodiment of the disclosure. In the case of DPDK, the CPU is in charge of changing the source and destination of the MAC and IP addresses and, in an embodiment of the disclosure, the GPU is in charge of it (in terms of their respective operating positions). When using the DPDK for the GPU, as described above in connection with FIG. 7, since data copying between worker-master GPUs are unavoidable, the performance is significantly lower than that of the embodiment of the disclosure. When using DPDK, it may be identified that the performance increases because the number of packets per second (PPS) significantly decreases as the packet size increases from 64 bytes (49.12%) to 1,514 bytes (80.58%). This means that as the chunk (packet) of data passing through the same bandwidth reduces, much more are needed. In contrast, an embodiment of the disclosure shows 100% forwarding performance in all packet sizes except for 64 bytes (88.5%) because data copying does not occur as data is transferred directly between NIC-GPU through P2P-DMA. For reference, in this test, the DPDK's I/O burst size (the number of packets sent or received by invoking the function once) is 32, and the number of packets gathered (batch size) to put data into and out of the GPU is 512.

FIG. 11 is a view illustrating the performance according to various warp batch sizes.

The effects of adjusting the degree of parallel processing are discussed. FIG. 11 illustrates the performance of an embodiment of the disclosure according to various warp_batch sizes. The size of warp_batch indicates the degree of parallel processing. In this test, the packet size is fixed to 64 bytes for the purpose of identifying the performance in the worst case environment. Unlike the case of performing only reception (Rx) or transmission (Tx), in the case of forwarding, when warp_batch is 4, that is, when 128 consecutive threads process packet I/O, the performance is the best, and after that, the performance rather degrades. The process of forwarding is discussed. The transmission (Tx) kernel may proceed only on the packets that the reception (Rx) kernel has proceeded on and send out the packets that have been completely received by the reception (Rx) kernel. The reception (Rx) kernel may receive new packets again according to the number of packet buffers returned to the memory pool after the transmission (Tx) kernel sends out a packet. Here, for zero-copy, the packet buffer is shared by passing only the authority, that is, the reception (Rx) and the transmission (Tx) are mutually affected by each other. In addition to these mutual constraints, packet forwarding requires continuous new allocation and return of packet buffers, identification of the owner of packet buffers, and change of source and destination of MAC/IP addresses as compared to unidirectional transmission. So, low parallelism (small warp_batch setting) cannot withstand this load and exhibit rapid performance degradation.

Meanwhile, it has been described above that the task authority for packet I/O is carried out in warp_batch units, which means that only after all threads belonging to the current warp_batch finish work, the next warp_batch may proceed. However, since the reception (Rx) kernel and the transmission (Tx) kernel are independent from each other, they are scheduled from separate hardware schedulers. Therefore, if the reception (Rx) kernel and the transmission (Tx) kernel increase in wrap_batch which is a range of threads to be mutually processed, this means that it becomes increasingly difficult to match the scheduling between the two kernels at once. Scheduling occurs in warp units. Therefore, matching scheduling for two consecutive warp ranges between different kernels is easier than matching four consecutive warp ranges. For this reason, if the size of warp_batch exceeds 128, it may be identified from the graph of FIG. 11 that the performance is rather reduced.

In the case of reception (Rx) and transmission (Tx) unidirectional transmissions, there is only a slight performance difference depending on the warp_batch size, but no significant difference occurs because packet buffer reallocation and return processes are omitted in these cases. Since only one kernel may perform only reception (Rx) or transmission (Tx), the buffers allocated at the start may be reused without returning them.

FIG. 12 is a view illustrating interference with a host (CPU)-side application operating on the same server.

Unlike DPDK that uses multiple CPU cores to process packet I/O for GPU, according to an embodiment of the disclosure, the CPU cores are not used at all because all operations are performed on the GPU after the initial initialization step. As a result of identifying through the Linux top command, the CPU core usage rate was 0% while an embodiment of the disclosure was operating. To identify more practical impacts, a noisy-neighbor test is conducted. Here, the noisy-neighbor test is shown as if, when applications A and B are running together on the same server, A and B use different CPU cores and access different memory spaces so that independence is ensured therebetween. However, in practice, A very frequently uses and continues to update the L3 cache which is shared by multiple cores so that a large number of cache misses occur in B's access to the L3 cache, adversely affecting B's performance A host (CPU) application that multiplies two matrices of size of 1,140×1,140 is used, and the size of the matrix data they use is exactly the same as the L3 cache and last level cache size of the PC used, i.e., 15 MB. In other words, this application will access all of the areas of the L3 cache, and if packet I/O, DPDK, or an embodiment of the disclosure that operates together with this application taints the L3 cache area even a little, the performance of this application will be affected.

Therefore, in this test, comparison in taken time is performed between when the host application uses DPDK as packet I/O for GPU and an embodiment of the disclosure is used. Table 1 of FIG. 12 shows the results.

It may be identified that in DPDK, every packet goes through the DRAM while packet I/O is conducted, so that the CPU cache is tainted and, as a result, the performing time is increased (slowed down) three times as compared with when the host application alone is performed independently. In contrast, an embodiment of the disclosure does not exhibit a significantly different required time compared to the idle state, and the slight difference is estimated as coming from access to the doorbell register mapped to the DRAM.

FIGS. 13 to 15 are views illustrating the performance of various network applications.

Further, applications used for performance verification are described.

To verify the performance and practicality of an embodiment (GPU-Ether) of the disclosure, three network applications are implemented and used. These are IPv4 forwarding (as known as software router), IPSec gateway, and NIDS (Network Intrusion Detection). These are also implemented in the form of a persistent kernel to maintain a low delay as in an embodiment of the disclosure. Therefore, the overhead of running the kernel is not included because they continue to run after starting until the program is terminated. This part is different from the prior art. Generally, GPU applications previously put data in GPU memory, copy it from DRAM to GPU memory by memory copy, and then launch the GPU kernel (which is a term indicating a GPU application). Therefore, in the case of network applications that require real-time processing as described above, to minimize the overhead when copying packet data from DRAM to GPU memory, a large number of packets are put in the GPU memory by batch-copying, and the GPU kernel is launched. This process may be repeated periodically, and the incoming speed of network packets is very fast (14.8 M packets per second, that is, about 14.8 million packets per second for 10 GbE. Even when batching a few hundred of these, GPU kernel launching per second enormously occurs). Thus, in reality, the overhead of launching these GPU kernels is unignorable because it happens so often.

For IPv4 forwarding, one GPU thread per packet is sufficient, but for the other two applications, it is required to allocate multiple threads per packet to reduce the burden on each thread and increase performance. A detailed configuration for each application is described below.

To identify the effect of packet 110 on performance in each application, performance comparison was conducted, with DPDK and an embodiment of the disclosure (GPU-Ether) connected to the same applications.

In the case of IPv4 forwarding (software router), DIR-24-8-BASIC is used as a lookup algorithm for a routing table to be used for IP forwarding (routing) as in previous studies. For more realistic measurement, the routing table was created based on the BGP table of RouteView created in the snapshot on Aug. 1, 2018. Here, RouteView is a non-profit project for research purposes that publishes tables of routers operating on a network actually serviced in North America by date. Because it is an actual network trace and table, it is used to identify the actual performance A snapshot has 474,319 unique prefixes (which may be regarded as the number of unique entries), of which only 2% exceed 24 bits. All the packets used in this test have a random destination IP address.

IPSec gateways are techniques commonly used in VPNs. The principle of VPN is discussed. From the header of the packet that is originally transferred directly from my PC to the destination server, it may be seen that the destination IP is the destination server IP. Thus, if the website is restricted by the country, it is blocked. Thus, VPN allows packets to pass through another destination IP (VPN server) to the destination. In this case, for the security of communication, an IPSec tunnel is created between the two nodes and all traffic flowing through it is encrypted. That part corresponds to IPSec. All packets are encrypted and sent using the previously promised key, so even when a packet is removed in the middle, it will be completely unrecognizable. AES-128 (CTR mode) and HMAC-SHA1 algorithms are used to implement the IPSec gateway ESP tunnel mode. In the case of AES, to maximize parallelism, each thread is left to process in units of AES blocks (16 bytes) so that multiple threads may simultaneously process different parts of one packet. However, in the case of SHA1 processing, since the finally generated authentication data is generated as a cumulative result of processing in units of SHA1 blocks (64 bytes), the blocks cannot be executed in parallel and should be processed sequentially. Therefore, they had to be parallelized on a packet-by-packet basis.

Further, since the persistent kernel may contain only 1,024 threads and has the characteristic of monopolizing one SM, if the structure of allocating multiple threads per packet as above is maintained, GPU threads may be insufficient since the packet size starts to exceed 512. Therefore, for packet processing of 512 bytes or more, one GPU thread is allowed to process multiple AES blocks, reducing the total number of threads required. This is possible because the PPS decreases rapidly as the packet size increases. In the above mode, the IPSec gateway increases the size of the original packet by adding additional headers and padding (adding blanks to match the size), and adding authentication data. Therefore, even after such processing, 1,460 bytes was set as the maximum packet size during testing so as not to exceed MTU 1,514 bytes, which is the maximum packet size of general Ethernet. All of the packets used in this test have a random source and destination IP and payload (data).

Network Intrusion Detection System (NIDS) is discussed. NIDS referenced the implementation of Snort, a well-known open source project in this field. Snort reads the ruleset (a file containing thousands of rules to be applied), saves it in TRIE format, and then checks, one by one, the payload of received packets using the Aho-Corasick (AC) algorithm. However, the Snort project is not only huge in scale but also uses a lot of data structures that are too complex to be transferred to the GPU. Thus, a somewhat simplified version was implemented. The linked list style TRIE created by Snort was transformed into a two-dimensional matrix and put into GPU memory. Each thread of this application identifies the destination port of the packet, and if a TRIE created for that port is found, it checks the payload of the corresponding packet. Here too, to maximize parallelism, the payload of the packet was split into equal pieces and distributed to multiple threads. For a 64-byte packet, the payload is only 18 bytes, except for the header and Ethernet CRC (46 bytes), that is, too small, so that one thread was used. In this test, all packets were rendered to have a random payload and destination port.

The performance of each application is discussed. FIGS. 13 to 15 illustrate the performance of the three applications. For IPv4 forwarding and NIDS, the same performance as the DPDK illustrated in FIG. 10 and the forwarding scenario of an embodiment of the disclosure was shown. For reference, all of the three applications additionally operate on the packet forwarding environment. In other words, if packet forwarding means receiving a packet and sending it back immediately, in the case of these applications, the applications receive the packets and passes the authority to the application, where they finish processing, and then send them back to the network. This means that for these two applications, packet I/O is the biggest bottleneck in their performance. As illustrated in FIGS. 13 and 15, application logic additionally performed in addition to packet I/O did not affect performance. In the case of IPv4 forwarding, a table lookup of the destination IP address is performed, and in the case of NIDS, pattern matching is performed on the payload part appropriately distributed to several threads. Because these two applications perform such a simple (light) task, there is no significant change in performance. However, the IPSec gateway is the only application, in which a modification is made to packets (that is, packets themselves are changed, e.g., by adding packet headers and authentication data, etc.) among the three types of test case applications, and the situation slightly differs.

As illustrated in FIG. 14, even though a number of GPU threads are allocated to each packet processing, performance degradation is unavoidable because a lot of read/write operations and memory copy operations are included. As such, given that the IPSec gateway is an application that needs to process computation/memory access for network traffic at the maximum line-rate, and an embodiment of the disclosure shows such extent of processing capacity, an embodiment of the disclosure is considered to be very useful for general GPU applications where packets of the basic MTU size are mainly communicated. The above network application is to test how much processing performance may be sustained by deliberately causing an excessive load.

There may be provided a non-transitory computer-readable storage medium for storing instructions that, when executed by a processor, enable the processor to execute a method, the method comprising being allocated an available packet buffer from a memory pool inside a GPU, directly transferring packets received from a network interface controller (NIC) through a reception (Rx) kernel to the allocated packet buffer, transmitting a transmission packet to a network through the NIC according to an operation of a transmission (Tx) kernel, and returning the allocated packet buffer.

Meanwhile, according to an embodiment of the disclosure, the various embodiments described above are implemented as software including instructions stored in a machine-readable storage media readable by a machine (e.g., a computer). The machine may be a device that may invoke a command stored in the storage medium and may be operated as per the invoked command. The machine may include an electronic device (e.g., the electronic device A) according to embodiments disclosed herein. When the command is executed by a processor, the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

Further, according to an embodiment of the disclosure, various embodiments described above may be implemented in a recording medium readable by a computer or a similar device using software, hardware, or a combination thereof. In some cases, the embodiments set forth herein may be implemented in the processor itself. When implemented in software, embodiments, e.g., procedures and functions, of the disclosure may be implemented in separate software modules. Each of the software modules may perform one or more functions and operations described herein.

Meanwhile, computer instructions for performing the processing operation of the device according to the various embodiments described above may be stored in a non-transitory computer-readable medium. The computer instructions stored in the non-transitory computer-readable medium, when executed by the processor of the specific device, enable the specific device to perform processing operations in the device according to the various embodiments described above. The non-transitory computer readable medium means a medium readable by a machine and semi-permanently storing data, as well as a medium storing data for a short time, such as registers, cash, and memories. Specific examples of the non-transitory computer-readable medium may include a CD, DVD, hard disk, Blu-ray disk, USB, memory card, ROM, and the like.

According to various embodiments, each component (e.g., a module or program) may be configured of a single or multiple entities, and the various embodiments may exclude some of the above-described subcomponents or add other subcomponents. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A method for inputting/outputting a packet based on a commodity Ethernet device performed by a graphic processing unit (GPU) internal packet input/output device, the method comprising:
   being allocated an available packet buffer from a memory pool inside a GPU;
   after packets received from a network interface controller (NIC) are directly transferred to the allocated packet buffer, processing the directly transferred packets through a reception (Rx) kernel that updates information for a ring descriptor related to the directly transferred packets;
   transmitting a transmission packet to a network through the NIC according to an operation of a transmission (Tx) kernel; and
   returning the allocated packet buffer.

2. The method of claim 1, further comprising:
   performing initialization by setting a memory pool and the ring descriptor to a GPU memory through peer to peer direct memory access (P2P-DMA) and setting a doorbell register in the GPU memory through two-step mapping.

3. The method of claim 1, wherein DMA addresses in a GPU memory pool replace packet buffer addresses which a driver of the NIC previously holds, when being initialized through an offset computation process.

4. The method of claim 2, wherein the received packets are directly transferred to a packet buffer in the GPU memory through P2P-DMA.

5. The method of claim 1, wherein each GPU thread is one-to-one mapped with the ring descriptor so that each thread is in charge of one descriptor.

6. The method of claim 1, wherein the memory pool is divided into a plurality of mini-memory pools independent for each of GPU threads, and
   wherein when the GPU threads access the memory pool, the GPU threads access different mini-memory pools.

7. The method of claim 1, wherein each GPU kernel has a unique identity (ID), and
   wherein only a kernel having a unique ID matching an ID written in a status register field of a specific packet buffer accesses a corresponding buffer.

8. The method of claim 1, wherein a warp batch including a plurality of warps which increase warp units simultaneously processable is determined as a default operation execution unit of a GPU packet I/O.

9. The method of claim 1, wherein transmitting the transmission packet to the network includes transmitting the transmission packet to the network through the NIC according to an operation of updating descriptor information by the transmission kernel and an operation of accessing a doorbell register.

10. A graphic processing unit (GPU) internal packet input/output device based on a commodity Ethernet device, comprising:
    a network interface controller (NIC) connecting to a network to transmit/receive packets;
    a memory pool including a plurality of packet buffers in a GPU memory;

a reception (Rx) kernel allocated an available buffer from a memory pool in a GPU and, after packets received from the NIC are directly transferred to the allocated packet buffer, processing the directly transferred packets through a reception (Rx) kernel that updates information for a ring descriptor related to the directly transferred packets; and a transmission (Tx) kernel transmitting a transmission packet to a network through the NIC and returning the allocated packet buffer.

11. The GPU internal packet input/output device of claim 10, wherein the reception kernel and the transmission kernel are initialized by setting a memory pool and the ring descriptor to a GPU memory through peer to peer direct memory access (P2P-DMA) and setting a doorbell register in the GPU memory through two-step mapping.

12. The GPU internal packet input/output device of claim 10, wherein DMA addresses in a GPU memory pool replace packet buffer addresses a driver of the NIC previously holds when being initialized through an offset computation process.

13. The GPU internal packet input/output device of claim 10, wherein each GPU thread is one-to-one mapped with the ring descriptor so that each thread is in charge of one descriptor.

14. The GPU internal packet input/output device of claim 10, wherein the memory pool is divided into a plurality of mini-memory pools independent for each of GPU threads, and wherein when the GPU threads access the memory pool, the GPU threads access different mini-memory pools.

15. The GPU internal packet input/output device of claim 10, wherein each GPU kernel has a unique identity (ID), and wherein only a kernel having a unique ID matching an ID written in a status register field of a specific packet buffer accesses a corresponding buffer.

16. The GPU internal packet input/output device of claim 10, wherein a warp batch including a plurality of warps which increase warp units simultaneously processable is determined as a default operation execution unit of a GPU packet I/O.

17. The GPU internal packet input/output device of claim 10, wherein the transmission kernel transmits the transmission packet to the network through the NIC according to an operation of updating descriptor information by the transmission kernel and an operation of accessing a doorbell register.

18. A non-transitory computer-readable storage medium for storing instructions that, when executed by a processor, enable the processor to execute a method, the method comprising:

being allocated an available packet buffer from a memory pool inside a GPU;

after packets received from a network interface controller (NIC) are directly transferred to the allocated packet buffer, processing the directly transferred packets through a reception (Rx) kernel that updates information for a ring descriptor related to the directly transferred packets;

transmitting a transmission packet to a network through the NIC according to an operation of a transmission (Tx) kernel; and returning the allocated packet buffer.

* * * * *